(12) United States Patent
Estes, III et al.

(10) Patent No.: US 10,783,258 B2
(45) Date of Patent: Sep. 22, 2020

(54) PISTOL ACTIVITY RECORDING DEVICE

(71) Applicants: James Clinton Estes, III, Weatherford, TX (US); Roger Forrester, Midlothian, TX (US)

(72) Inventors: James Clinton Estes, III, Weatherford, TX (US); Roger Forrester, Midlothian, TX (US)

(*) Notice: Subject to any disclaimer, the term of this patent is extended or adjusted under 35 U.S.C. 154(b) by 203 days.

(21) Appl. No.: 15/828,416

(22) Filed: Nov. 30, 2017

(65) Prior Publication Data

US 2018/0157850 A1    Jun. 7, 2018

Related U.S. Application Data

(60) Provisional application No. 62/428,209, filed on Nov. 30, 2016.

(51) Int. Cl.
| | |
|---|---|
| *G06F 21/60* | (2013.01) |
| *F41C 33/02* | (2006.01) |
| *F41C 27/00* | (2006.01) |
| *G06F 16/00* | (2019.01) |
| *G06F 21/64* | (2013.01) |
| *G11B 20/10* | (2006.01) |

(52) U.S. Cl.
CPC .......... *G06F 21/602* (2013.01); *F41C 33/029* (2013.01); *G06F 16/00* (2019.01); *G06F 21/64* (2013.01); *F41C 27/00* (2013.01); *G11B 2020/10546* (2013.01)

(58) Field of Classification Search
CPC ...... G06F 21/602; G06F 16/00; F41C 33/029; F41C 27/00; G11B 2020/10546

USPC .......................................................... 340/500
See application file for complete search history.

(56) References Cited

U.S. PATENT DOCUMENTS

| | | |
|---|---|---|
| 5,479,149 A | 12/1995 | Pike |
| 5,916,087 A | 6/1999 | Owens |
| 6,823,621 B2 | 11/2004 | Gotfried |
| 7,158,167 B1 | 1/2007 | Yerazunis et al. |
| 7,363,742 B2 | 4/2008 | Nerheim |
| 7,944,676 B2 | 5/2011 | Smith et al. |
| 8,069,605 B2 | 12/2011 | Fressola et al. |
| 9,217,616 B2 | 12/2015 | Sullivan et al. |
| 9,564,043 B2 * | 2/2017 | Sanders ................ F41C 33/029 |

(Continued)

FOREIGN PATENT DOCUMENTS

| | | |
|---|---|---|
| GB | 2397914 A | 8/2004 |
| WO | 2015-156921 A1 | 10/2015 |

OTHER PUBLICATIONS

Maher, Robert C., "Acoustical Characterization of Gunshots," SAFE 2007, Apr. 11-13, 2007, Washington, D.C.

(Continued)

*Primary Examiner* — John A Tweel, Jr.
(74) *Attorney, Agent, or Firm* — Jack D. Stone, Jr.; Scheef & Stone, L.L.P.

(57) ABSTRACT

A device mountable on a pistol holster configured for detecting when a pistol is removed from the holster and, when removed, for activating a controller to receive, process, and record in memory audio signals from a microphone and to receive, process, and record in memory motion and compass direction signals. A connector is provided for transferring signal data to an external device configured with software for analyzing the acoustical characteristic of gunshots.

17 Claims, 12 Drawing Sheets

(56) References Cited

U.S. PATENT DOCUMENTS

| | | |
|---|---|---|
| 9,591,255 B2 * | 3/2017 | Sakiewicz .............. H04N 5/772 |
| 9,752,840 B1 * | 9/2017 | Betro .................... H04W 4/029 |
| 9,829,275 B2 * | 11/2017 | Madrid ................ F41C 33/029 |
| 9,846,007 B2 * | 12/2017 | Young .................. F41C 33/029 |
| 9,945,640 B2 * | 4/2018 | Lyren .................... F41G 3/165 |
| 2006/0082730 A1 | 4/2006 | Franks |
| 2007/0044365 A1 | 3/2007 | Deken |
| 2008/0061991 A1 | 3/2008 | Urban et al. |
| 2010/0284683 A1 | 11/2010 | Fressola et al. |
| 2011/0035984 A1 | 2/2011 | Liu |
| 2014/0162584 A1 | 6/2014 | Cope |
| 2015/0254968 A1 | 9/2015 | Sanders et al. |
| 2015/0369554 A1 | 12/2015 | Kramer |
| 2015/0369559 A1 | 12/2015 | Del Rosario |
| 2016/0241807 A1 | 8/2016 | Kovac |
| 2016/0290766 A1 | 10/2016 | Williams et al. |
| 2017/0133051 A1 * | 5/2017 | Mack .................... A41D 1/002 |
| 2018/0277154 A1 * | 9/2018 | Mack ................ A41D 19/0027 |

OTHER PUBLICATIONS

European Patent Office, Search Report, EP Appln. No. 178769063, dated Jul. 10, 2020.

\* cited by examiner

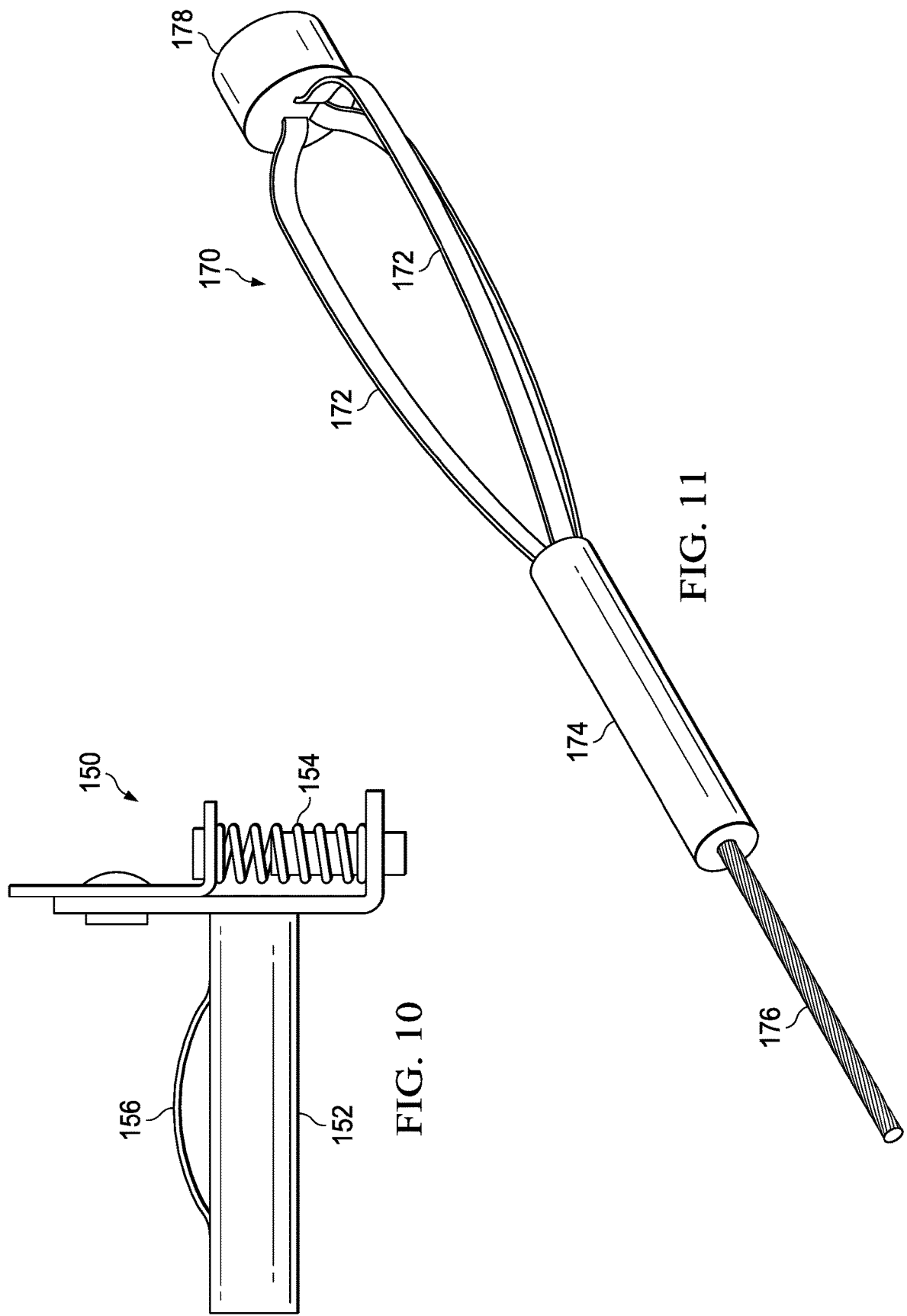

US 10,783,258 B2

PISTOL ACTIVITY RECORDING DEVICE

CROSS-REFERENCE TO RELATED APPLICATIONS

This application claims the benefit of U.S. Provisional Application No. 62/428,209, filed Nov. 30, 2016, which application is hereby incorporated herein by reference, in its entirety.

TECHNICAL FIELD

The invention relates generally to a device and method for recording data such as audio, motion, and compass and direction data relating to activity of a pistol.

BACKGROUND

Police must periodically use their weapons in the line of duty. Similarly, individuals must on occasion use a weapon in self-defense. These are tragic events that everyone would prefer to avoid, but when they nonetheless happen, the shooter must defend his or her action. Such defense, though, is often difficult to substantiate, often relying solely on the testimony of the shooter. Therefore, what is needed is a system and method for providing an improved defense for a shooter.

SUMMARY

The present invention, accordingly, provides a low cost, wearable, recording device for the sole purpose of self-defense and self-representation. The device is mounted or attached on or to a pistol holster, belt, shirt pocket, the outside of a lady's purse or a pouch type holster, or the like using a metal clip, screws with nuts, barrel screws, rivets, Velcro®, or adhesive (e.g., glue), or the like. The device focuses primarily on the actions and reactions of the user in defense before, during, and/or after a life-threatening incident to verify the user's innocence. The information gathered on the device will enable persons legally defending themselves to give a precise audio, video, timeline, and body movement account for investigators and the courts.

Users of the device would preferably pre-record (i.e., prior to a shooting incident) samples of their voice and rounds fired by the pistol they would carry while using the device to establish their own unique electronic signatures. Alternatively, or additionally, electronic signatures may be established by recording samples of a user's voice and rounds fired by a pistol after an incident has occurred. The device can be activated by either pushing a momentary "record" button or by a holster switch activated by drawing the pistol out of the holster. The device will begin recording the instant the pistol is drawn and continue recording for a predetermined period of time.

The recording quality is high and uncompressed to record at high resolution the unique audio signature of a fired round and can be recognized as belonging to the owner of the device. Identification of a gunshot may be made by comparing the recorded audio of a gunshot to pre-recorded (or post-recorded) samples. Other rounds fired will also be recognizable as not belonging to the device owner and may be traveling in the direction on the device wearer. This is achieved preferably incorporating technology to identify gunshots by its respective acoustical characterization, such as discussed in an article found at the following link: http://www.montana.edu/rmaher/publications/maher_ieee-safe_0407_109-113.pdf. Additional functions of the device include recording date and time, preferably via a real time clock with a long life, e.g., 10-years, battery, movement (preferably via a gyroscope) of the wearer, and optionally by video from the view of the pistol as it is being aimed in self-defense. The device, other than the real time clock, is preferably powered by rechargeable (e.g., lithium ion) batteries (preferably supplying 3.3 volts, optionally via a power converter) with a nonuse shelf life of at least six months.

Recorded information is preferably analyzed using software that places all the data on a single screen and in linear timeline format. The real time clock is preferably set at the time of manufacturing, is provided with its own power source, and is tamper-proof. The end-user only needs to register his or her device at the time of purchase, and make sample audio recordings of his or her voice and weapon being fired. The transfer of all data is preferably done through a flash drive interface each time the device battery is charged (e.g., every 60 to 180 days) (access to a computer is not necessary). Generally, the software only needs to be used when analyzing the data when an incident occurs or for the user to periodically verify the device is working properly.

In a preferred embodiment, a small power-on LED indicator light, preferably of a color such as green, is mounted on the device. It is preferably configured to flash twice when the system is turned on and is working properly, and to stay on when recording.

There is preferably also a small LED indicator light, preferably of a color such as red that is different from the green power-on LED, mounted on the device. It is preferably configured to be on continually to indicate when there is a low battery warning (e.g., less than 3.3 volts), and to flash to indicate an inoperably low battery warning (e.g., less than 3.0 volts).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 10 exemplifies one ancillary device that may be used in connection with the device of FIGS. 1-9 to insert in the barrel of a gun which does not holster;

FIG. 11 exemplifies an alternative ancillary device that may be used in connection with the device of FIGS. 1-9 to insert in the barrel of a gun which does not holster;

DETAILED DESCRIPTION

Figure 1:
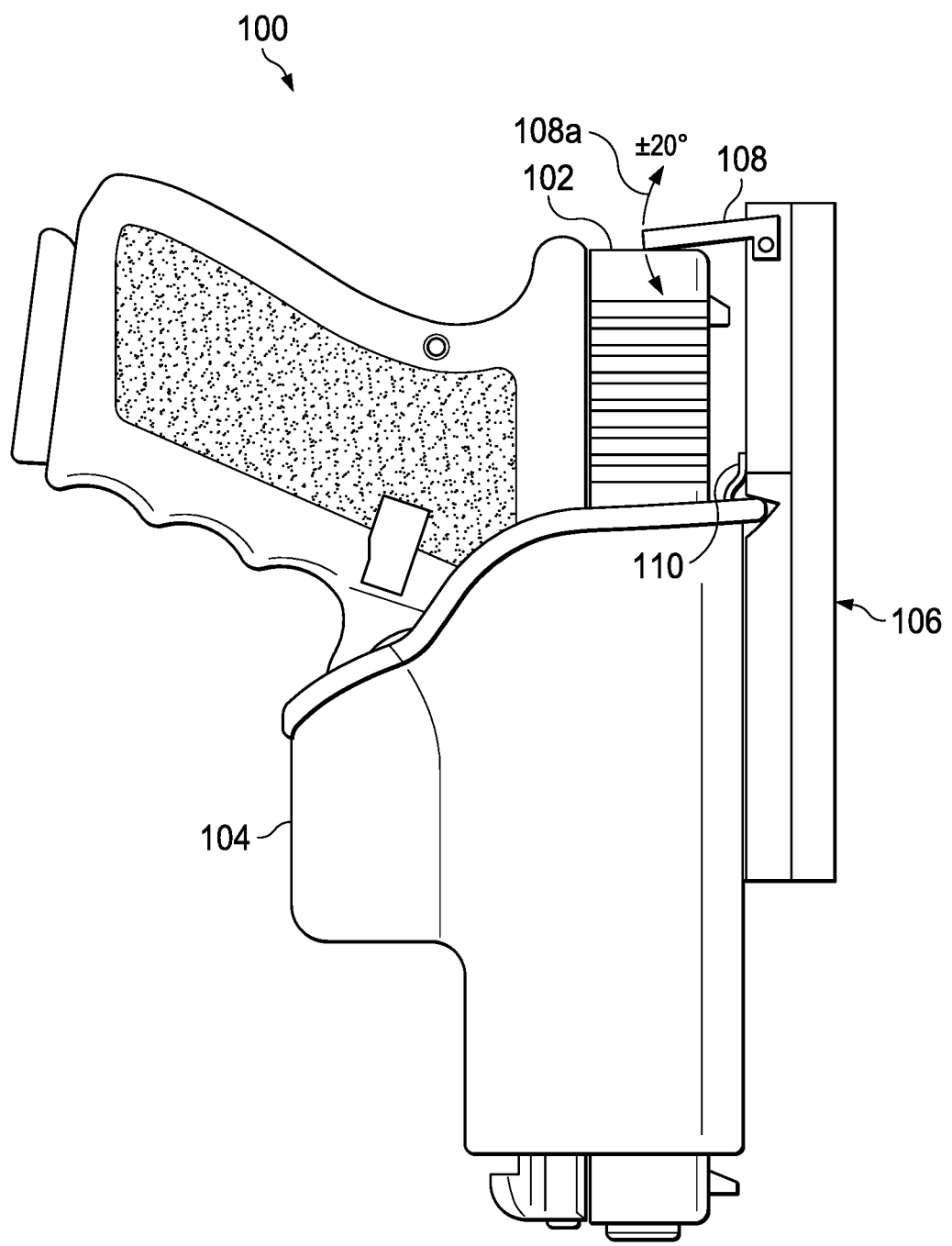
FIG. 1 exemplifies a pistol in a holster to which is attached a pistol activity recording device embodying features of the present invention.

Refer now to the drawings wherein depicted elements are, for the sake of clarity, not necessarily shown to scale and wherein like or similar elements are designated by the same reference numeral through the several views. In the interest of conciseness, well-known elements may be illustrated in schematic or block diagram form in order not to obscure the present invention in unnecessary detail, and details concerning various other components known to the art, such as printed circuit boards, and components thereof necessary for the operation of many electrical devices, have not been shown or discussed in detail inasmuch as such details are not considered necessary to obtain a complete understanding of the present invention, and are considered to be within the skills of persons of ordinary skill in the relevant art. Additionally, as used herein, the term "substantially" is to be construed as a term of approximation.

It is noted that, unless indicated otherwise, many functions described herein may be performed by a processor such as a microprocessor, a controller, a microcontroller, an application-specific integrated circuit (ASIC), an electronic data processor, a computer, or the like, in accordance with code, such as program code, software, integrated circuits, and/or the like that are coded to perform such functions. Furthermore, it is considered that the design, development, and implementation details of all such code would be apparent to a person having ordinary skill in the art based upon a review of the present description of the invention.

The term "pistol" is used herein to represent any weapon that a person may carry in a holster, such as a knife, stun gun, pepper spray, and the like.

Figure 2:
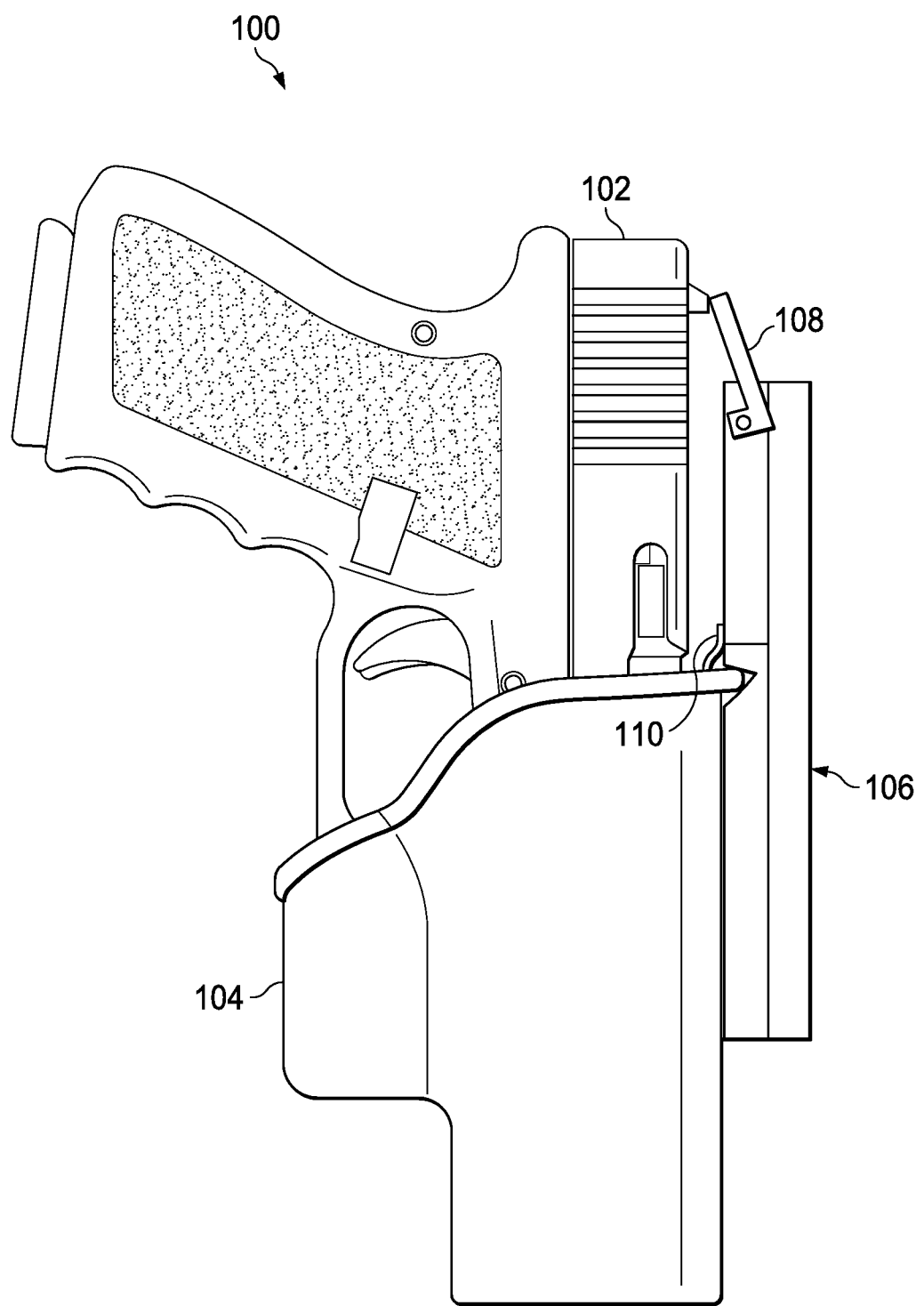
FIG. 2 exemplifies the pistol of FIG. 1 in the process of being removed from the holster of FIG. 1.
Figure 3:
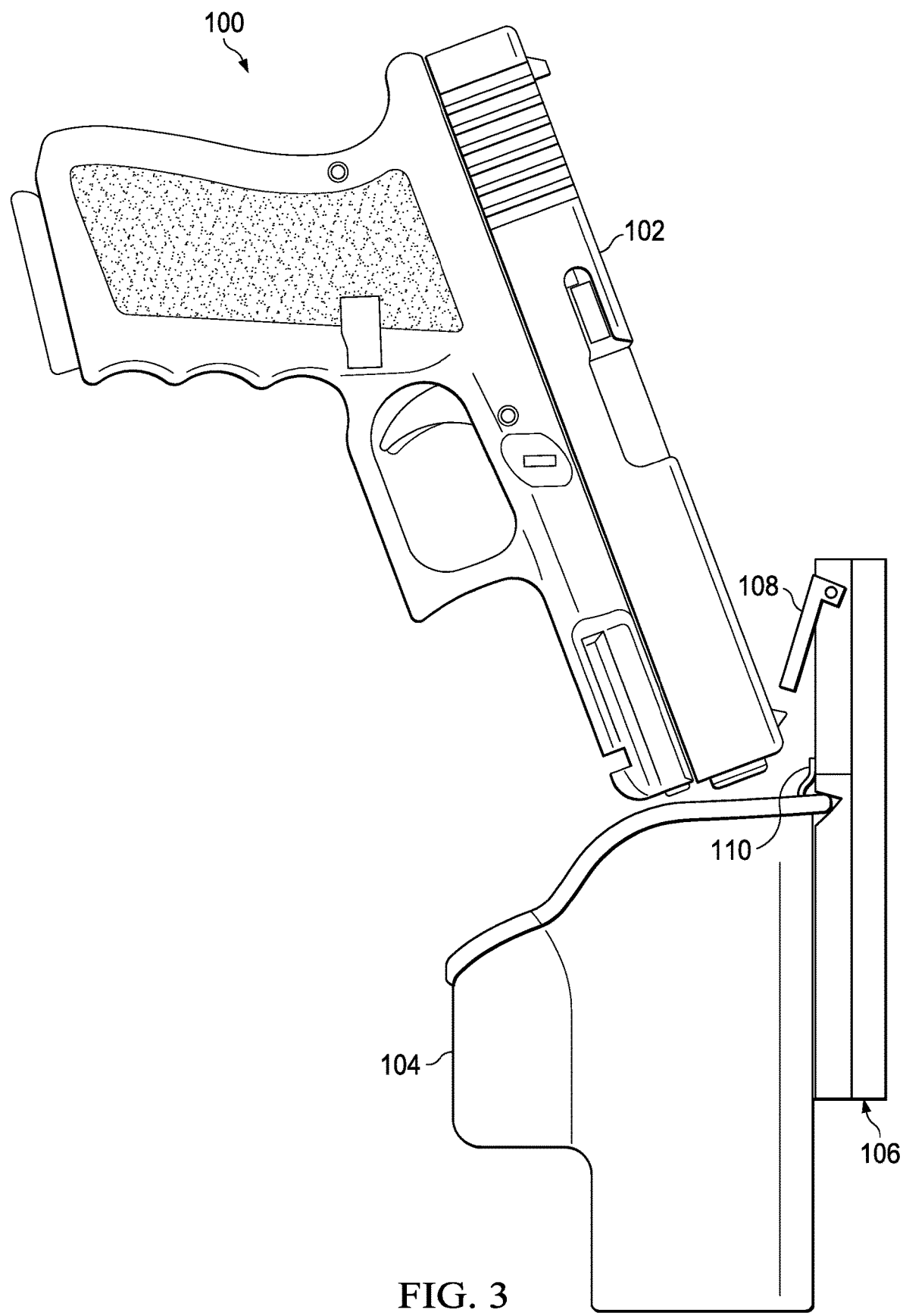
FIG. 3 shows the pistol of FIG. 1 totally removed from the holster of FIG. 1.

Referring to FIG. 1 of the drawings, the reference numeral 100 generally designates a pistol activity recording system incorporating a holster 104 carrying a pistol 102. A pistol activity recording device 106 is secured to the holster and includes a holster switch lever 108. As discussed in further detail below, if lever 108 moves more than 20° clockwise or counterclockwise, shown by arc 108a, that is indicative that pistol 102 has been removed from holster 104, as shown more clearly in FIGS. 2 and 3. Accordingly, movement of the lever 108 in the clockwise direction is shown in FIG. 2 with the partial removal of pistol 102 from holster 104. Movement of the lever 108 in the counter-clockwise direction is shown in FIG. 3 with the full removal of pistol 102 from holster 104.

Figure 4:
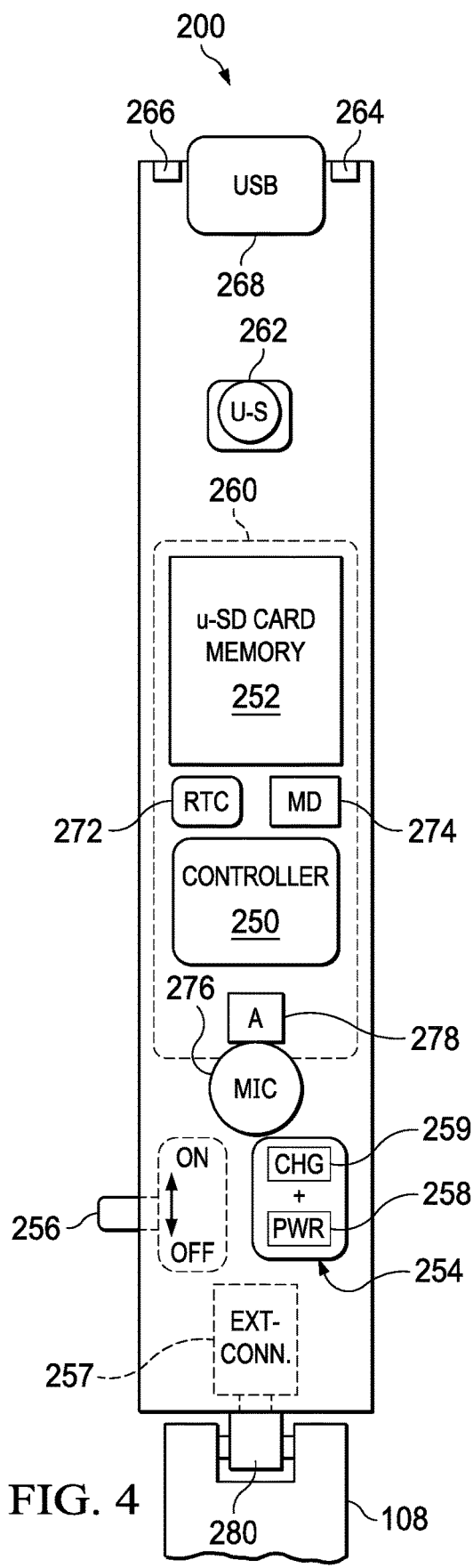
FIG. 4 exemplifies a printed circuit board utilized in the pistol activity recording device of FIGS. 1-3.
Figure 5:
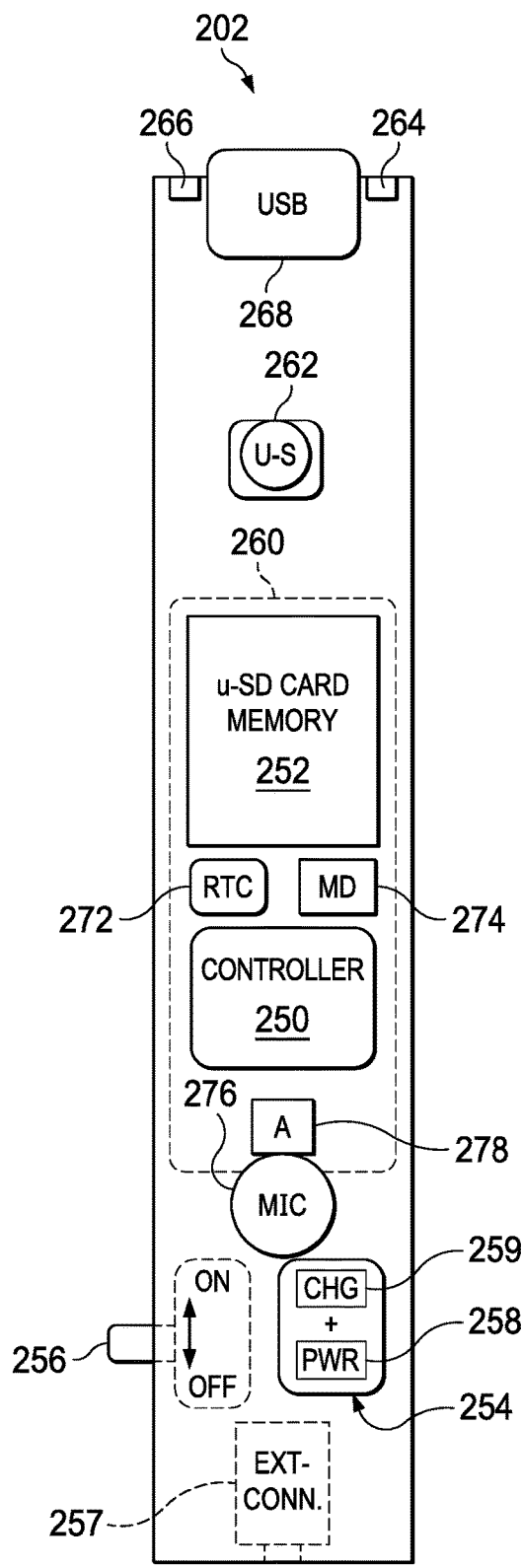
FIG. 5 exemplifies a printed circuit board for use in an alternate embodiment of the invention.
Figure 6:
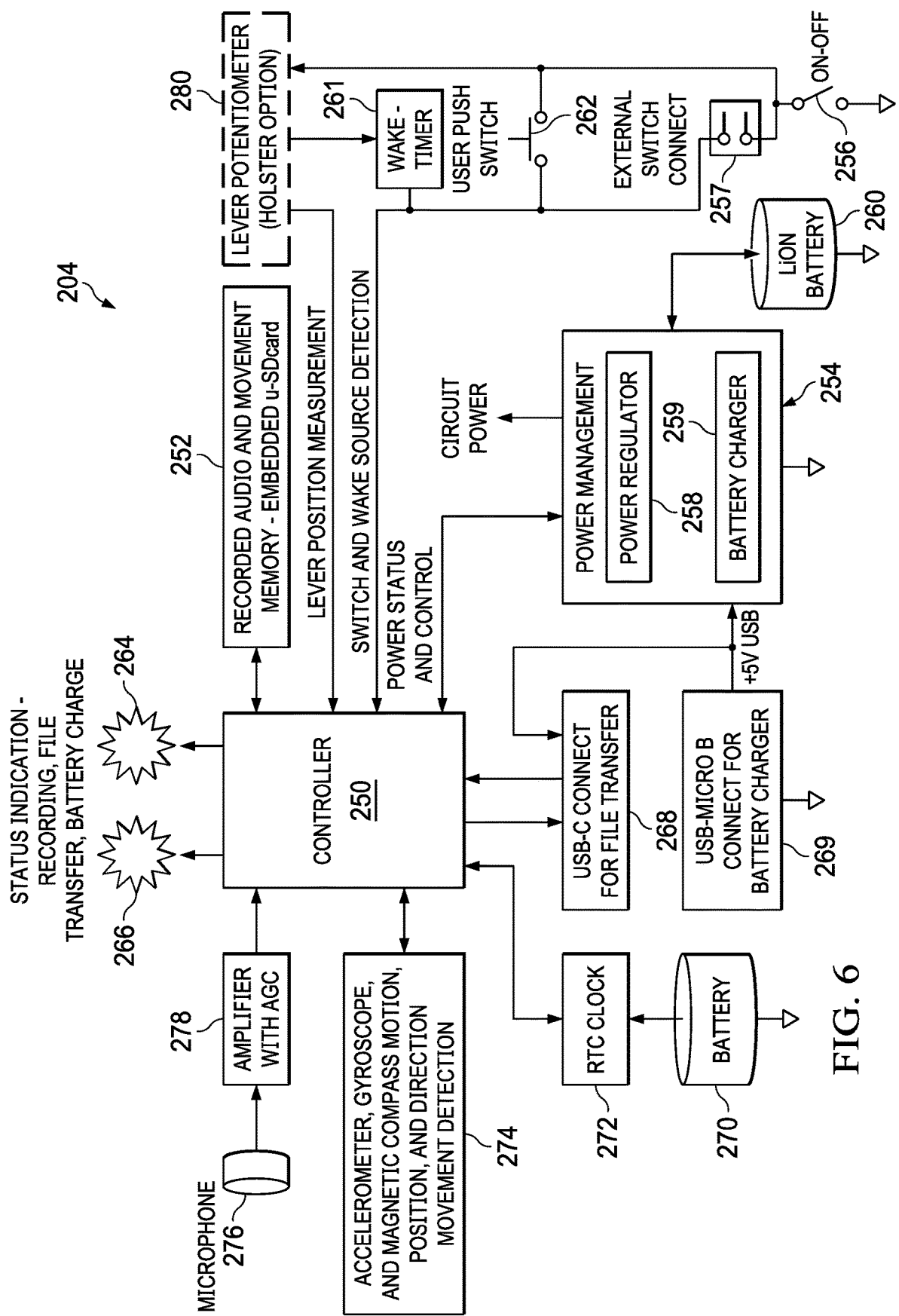
FIG. 6 exemplifies a block diagram showing various components and interconnections of the various components in one embodiment of the invention.

FIGS. 4-6 exemplify two embodiments 200 and 202 and an electrical schematic 204 of a printed circuit board ("PCB") constituting pistol activity recording device 106 embodying features of the present invention, preferably including the following. It is noted that downwardly pointing triangular arrows in FIG. 6 represent ground.

A controller 250, also referred to as a microcontroller, controls operations of device 106. A memory 252 is coupled to controller 250 for storing program code and data generated and used by controller 250. Memory 252 is preferably an embedded micro SD card that is not easily accessible by a user, and which has a capacity of preferably at least 4 GB, up to about 64 GB.

A battery 260 is provided on the underside (as viewed in FIG. 4) of the PCB for supplying power to the PCB and its components. Battery 260 is preferably a rechargeable lithium ion battery that holds a charge of 4.5 to 5.5 volts. A power management module 254 preferably includes a battery charger 259 for charging battery 260, and a power regulator 258 for maintaining a voltage such as 3.3 volts to the components of the PCB.

There are preferably two LED indicators: one to indicate recording active (preferably green) 264 and one to indicate battery status (preferably red) 266. Battery indicator is ON for charging condition, OFF when charged or no charge power is present, slow flash when battery is low. Battery indicator will light for 2 seconds whenever USB power is applied no matter the charge condition.

Two user switches are provided: a Power ON/OFF switch 256, and a user push record switch ("US") 262. Record switch 262 will preferably provide at least 30 minute increments of record time from the moment a user switch is pressed.

Micro USB connector 268 is preferably USB-C coupled to controller 250 for transferring data to and from device 106. USB 268 will operate as a flash drive host when a USB flash drive is connected. A USB connector 269 is preferably USB B for providing battery charge when the USB cable is powered by an external source. ON/OFF switch 256 must be in ON position and battery sufficiently charged to support a flash drive.

A remote enable connector 1224 and 324 (FIGS. 9 and 12, respectively) facilitates connecting to controller 250 an external switch connector for accessories to enable the recorder.

A real time clock ("RTC") 272 coupled to controller 250 is preferably set when manufactured and includes its own power source, preferably a battery 270 that can power the RTC for an extended time, such as seven years. RTC 272 is used by controller 250 for appending date-time stamps to data recorded in memory 252.

A motion detector ("MD") 274 is coupled to controller 250 and preferably includes components such as an accelerometer, gyroscope, and compass for detecting motion, acceleration, direction of motion, and orientation of a user during an altercation. The data generated is preferably received and managed and encrypted by controller 250 and stored in memory 252.

A microphone 276 is coupled to controller 250 for receiving audio generated during an altercation. The audio is preferably recorded at 44.1 kHz with a bit depth of at least 16, preferably 32. More or less audio resolution may be used as suitable or as desirable. Microphone 276 is preferably supplemented with an amplifier 278 connected between microphone 276 and controller 250, and the amplifier preferably includes Automatic Gain Control ("AGC"). Microphone 276 is preferably replaceable should the unit get wet.

The ON/OFF switch 256 powers on and off device 106. When switch 256 is OFF, operation of the device is disabled, with exception of the battery charging function 259. User push record switch 262 may be pressed by a user to initiate recording or audio and motion. External switch connect 257 is effective in connecting an external switch to initiate recording, as discussed below with respect to FIGS. 8-13.

Lever 108 (FIGS. 1-4) is coupled to a potentiometer 280 which is coupled to controller 250 for generating resistance to electrical current by which controller 250 can detect an amount of angular movement of lever 108. In operation, the lever is calibrated when pistol 102 is positioned in holster 104. This is done by positioning pistol 102 in holster 104 while device 106 is powered off. Then, when it is powered on, controller 250 stores in memory 252 the angle of lever 108 (determined by resistance imposed by potentiometer 280). Then, if that angle deviates by a predetermined amount, such as a deviation greater than 20° (see arc 108a in FIG. 1), that is indicative that pistol 102 is being, or has been, removed from holster 104, and audio and motion should begin recording, as discussed in further detail below.

FIG. 5 shows an alternate embodiment PCB 202 of PCB 200 which is similar to that shown in FIG. 4, but for the absence of potentiometer 280 and lever 108. PCB 202 facilitates use with remote switches, such as discussed below with respect to FIGS. 8-13.

FIG. 6 depicts the components discussed above with respect to FIGS. 4 and 5, and their respective interconnections.

In operation, when device 106 is enabled by one of the switch inputs 256 or 262, the unit is preferably configured to record audio, motion, and compass direction of motion for a predetermined period of time, such as 30 minutes or more. After the predetermined period of time, the unit shuts down to conserve battery charge. Operation is indicated by a Run Indicator red LED 266. Audio and motion recording is activated by one of user push record switch 262, holster switch 108, a closed remote switch 1206 or 302 (used in a purse or carry pouch clip option), and a wake timer 261 coupled between potentiometer 280 and controller 250.

When USB power 254 is applied, the lithium-ion (Li-ion) type rechargeable battery 260 will recharge and charge status will be presented. The charge indicator will light 266 when power is applied for about 2 seconds minimum and then indicate charging status.

Each device 106 is preferably provided with a unique 128 bit serial number that is applied for device tracking and record file encryption. The serial is embedded in controller 250 during manufacturing and is applied to all recordings of data.

A recorded data event is maintained in one of two formats: Two time-stamped and time-sequenced files where one file contains audio data and one file contains motion data, or one file contains all of the event data. File(s) will preferably be encrypted by a unique algorithm that includes unit serial number and a digital pass key to decrypt.

Audio recording at memory 252 will provide playback, preferably compliant to a 44.1 KHz or 48 KHz Wave file. Motion detector 274 will preferably provide a 100 Hz sample rate.

Recorded files will preferably be maintained on SD memory card 252 until memory space is required by a new recording event. The files are preferably removed in sequence of oldest first (FIFO) as memory space is needed.

Recorded files at memory 252 will preferably be copied to a connected USB flash drive automatically in order of most recent file to the oldest file. Files will preferably be copied until SD memory card 252 files are copied complete or USB flash memory is full, whichever occurs first. USB flash memory will preferably not be formatted or existing files erased or modified.

The Record Status green LED indicator 264 will preferably flash at about a 1 second rate during USB file transfers and go out when complete. If an error occurs connecting the USB or transferring at least one event set of files, the green status light 264 will preferably go out and the red battery light 266 will preferably flash about twice a second for five seconds.

USB connection 268 will preferably stop any recording in process and close the record file. This file will preferably be the first file copied to the USB flash drive.

In a preferred embodiment, by way of example but not limitation, device 106 would preferably be characterized as follows:

Mechanical Size: 4 inches long, 0.8 inches wide, 0.6 inches High maximum

Battery Life: sufficient to record for at least one hour (e.g., 220 maH capacity)

Charging Supply: +4.5V to +5.5V, 100 ma typical (2.5 hour full charge rate)

Real Time Clock: +/−30 minutes per year, 7 years minimum run time

Weight: TBD (6 oz estimated—AL 6061)

Microphone: 60 dB Gain minimum, AGC controlled (low distortion/no clipping)

Connector, switch, and indicator locations may be adjusted depending on various factors, such as mechanical packaging.

Figure 7:
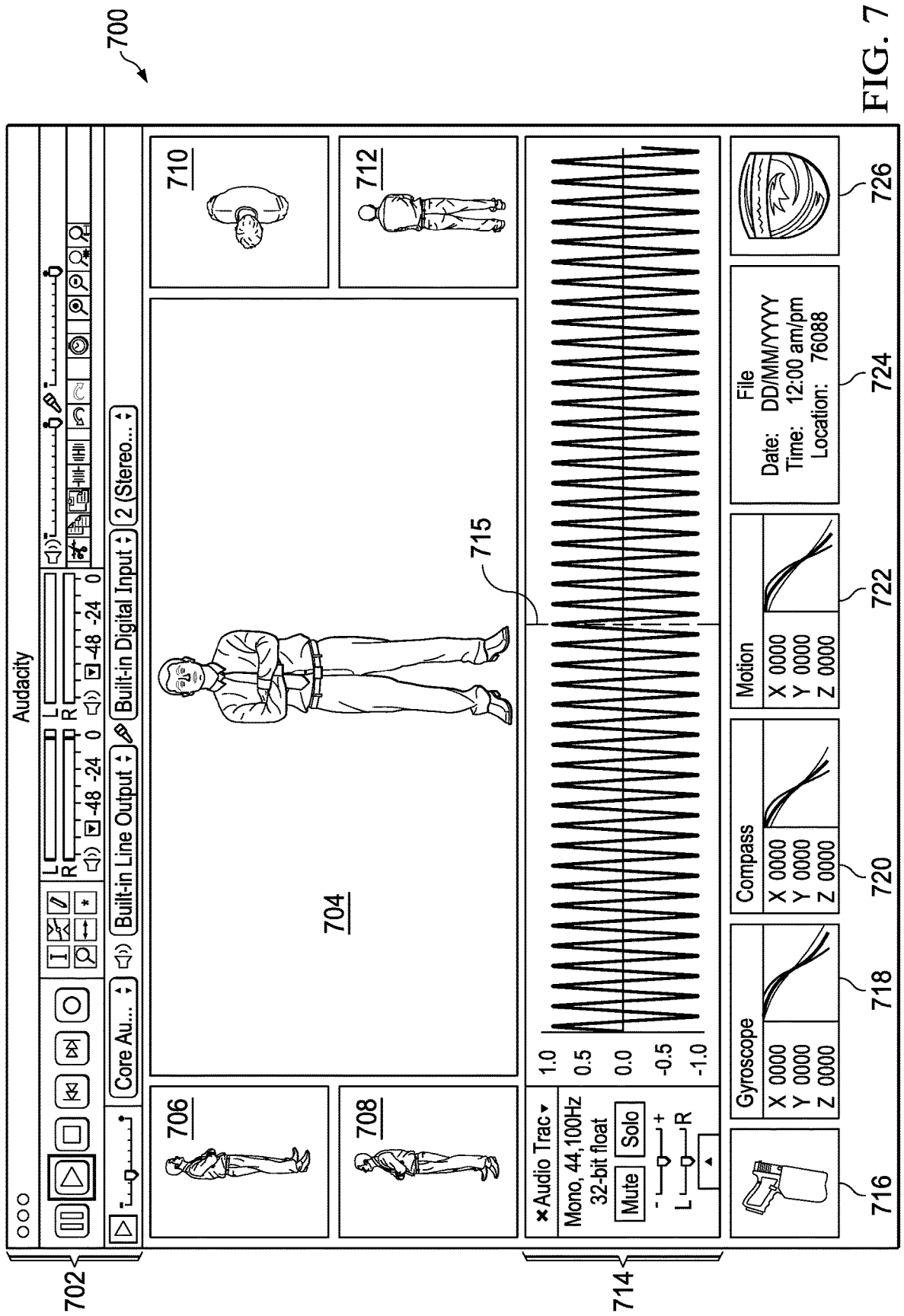
FIG. 7 is a screenshot exemplifying acoustical characterizations of a gunshot.

FIG. 7 exemplifies a screen display 700 generated by an external computer (not shown) showing acoustical characteristic software for analyzing gunshots recorded by the device against gunshots from the gun in question. Screen display 700 includes a menu bar 702 for controlling functionality of the software. Gyroscopic data 718, compass (magnetometer) data 720, and motion data 722, all along color-coded x, y, and z coordinate axes, are displayed in motion on screen 700. A visual of how that data affected the user is shown graphically in screen portions 704-712. Screen portion 704 displays a frontal view of the user, while 706 shows a right side view, 708 a left side view, 710 a top view, and 712 a back view. For example, if a user is knocked down, it would be reflected in each view accordingly. Screen portion 714 displays audio in decibels, on the vertical axis, with time on the horizontal axis. In a preferred embodiment, the decibel waves shown move from right to left with current time shown by a stationary line 715.

Figure 8:
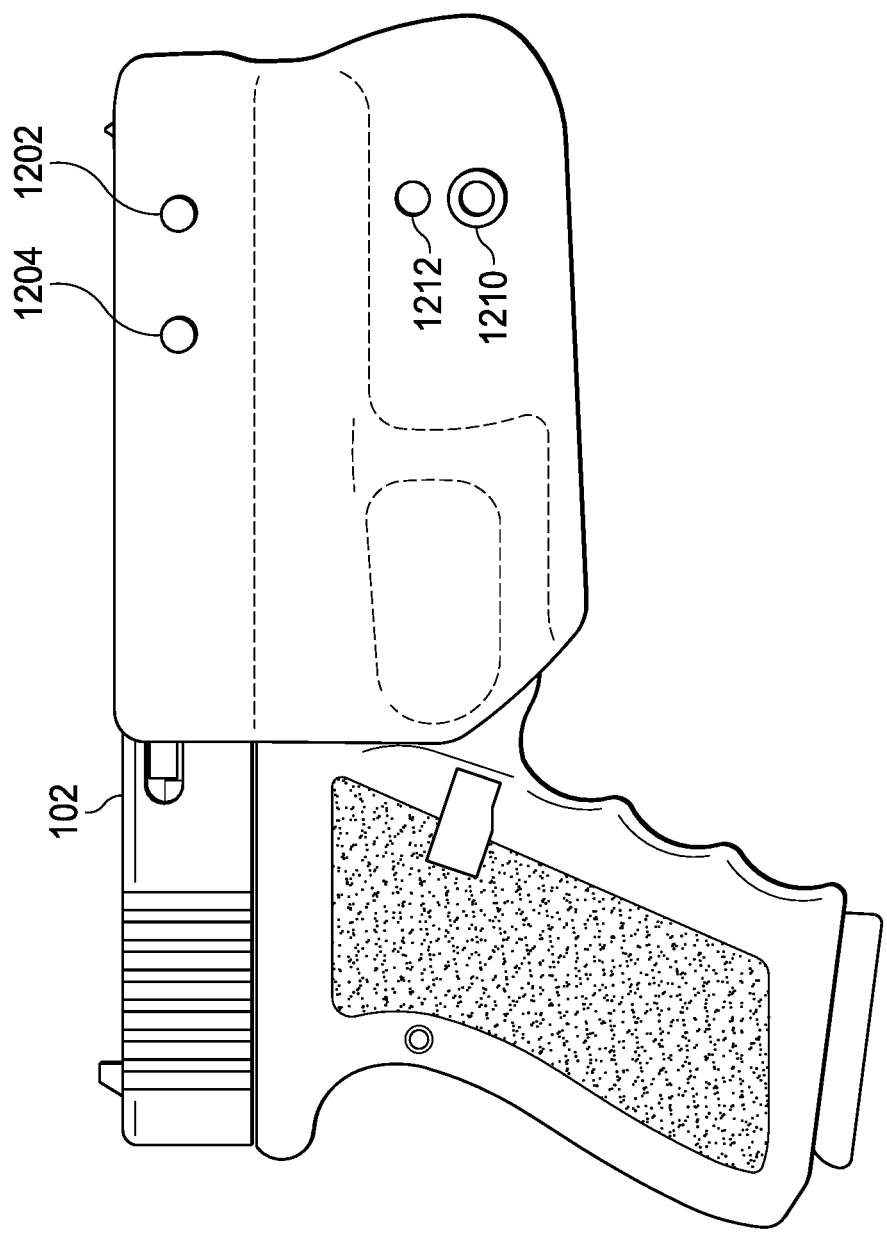
FIG. 8 exemplifies an alternate embodiment of a holster for which the invention may be used.
Figure 9:
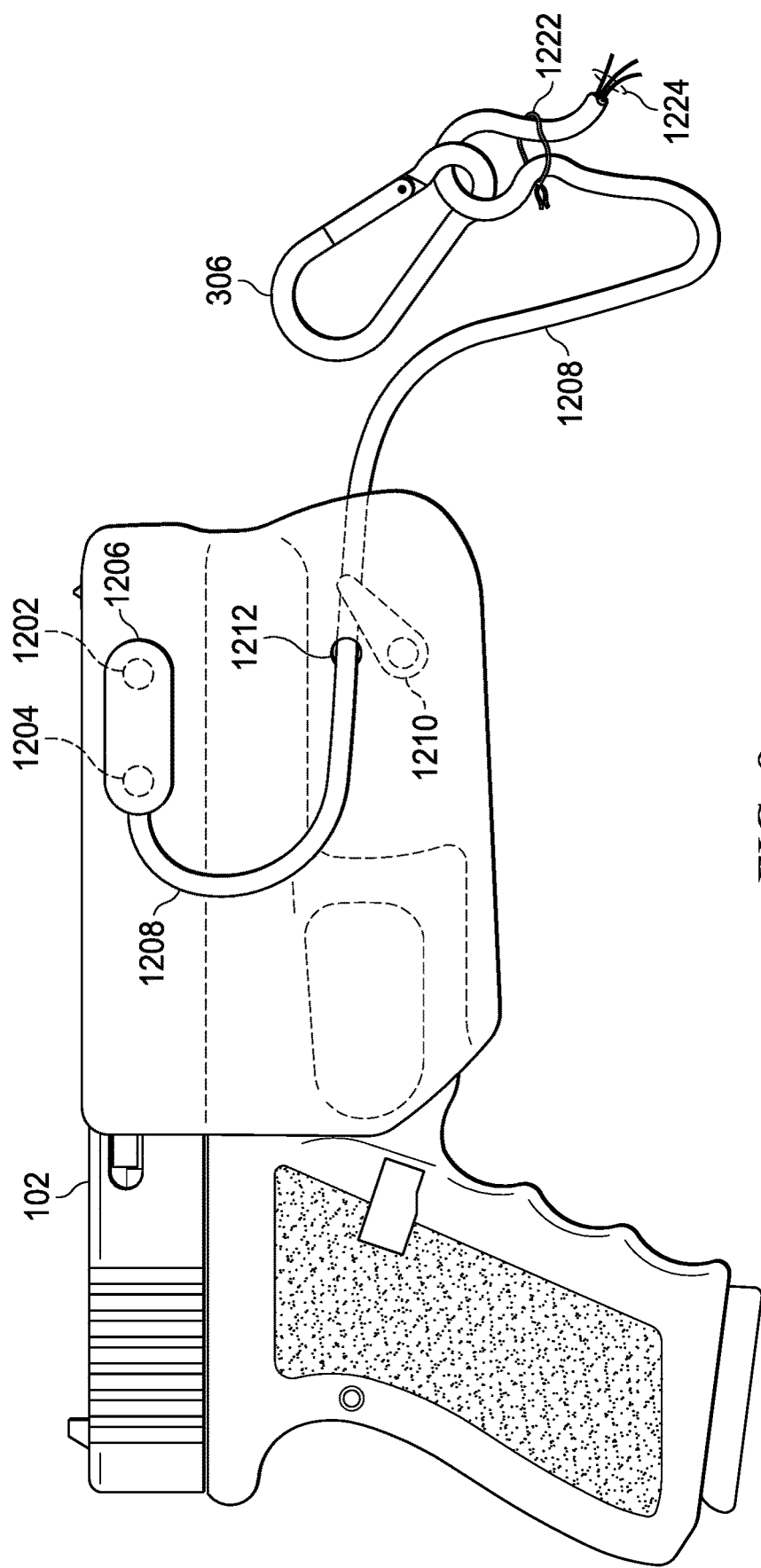
FIG. 9 exemplifies a switch mounted on the holster of FIG. 8.

In a further embodiment, FIGS. 8 and 9 exemplify an alternate embodiment of the invention, useful when a pistol is not kept in a holster on, for example, a person's belt. A Kydex® or similar trigger guard is adapted with a mechanical switch 1206 to activate the Record function when pistol 102 is removed from the trigger guard. Switch 1206 is secured to the trigger guard through two holes 1202 and 1204. Switch 1206 is electrically connected to controller 250 through a tether cable 1208 comprising wires 1224, which preferably connect to controller 250 through external connection 257. Cable 1208 is secured to the trigger guard by restraint 1210 and to a purse or pouch or the like via a hook such as a carabiner 306 secured on cable 1208 via a tie 1222. Additionally, the Kydex® trigger guard provides an extra layer of protection by enclosing the trigger, and it is easily adaptable to any weapon. A Kydex® trigger guard would preferably include tether cable 1208 and carabiner 306.

In a still further embodiment, FIGS. 10 and 11 exemplify ancillary devices 150 and 170, respectively, that may be used in connection with the device 106 of FIGS. 1-7 to insert in the barrel of a gun which does not holster, but which may be stored elsewhere, such as in a purse or pouch. When a pistol is removed from a purse, the device 150 or 170 is dislodged from the barrel, allowing a flexible metal strip, such as the strip 156 or 172 to expand and close a circuit which activates (i.e., closes) a switch to record subsequent activity, as would the holster switch lever 108.

Figure 12:
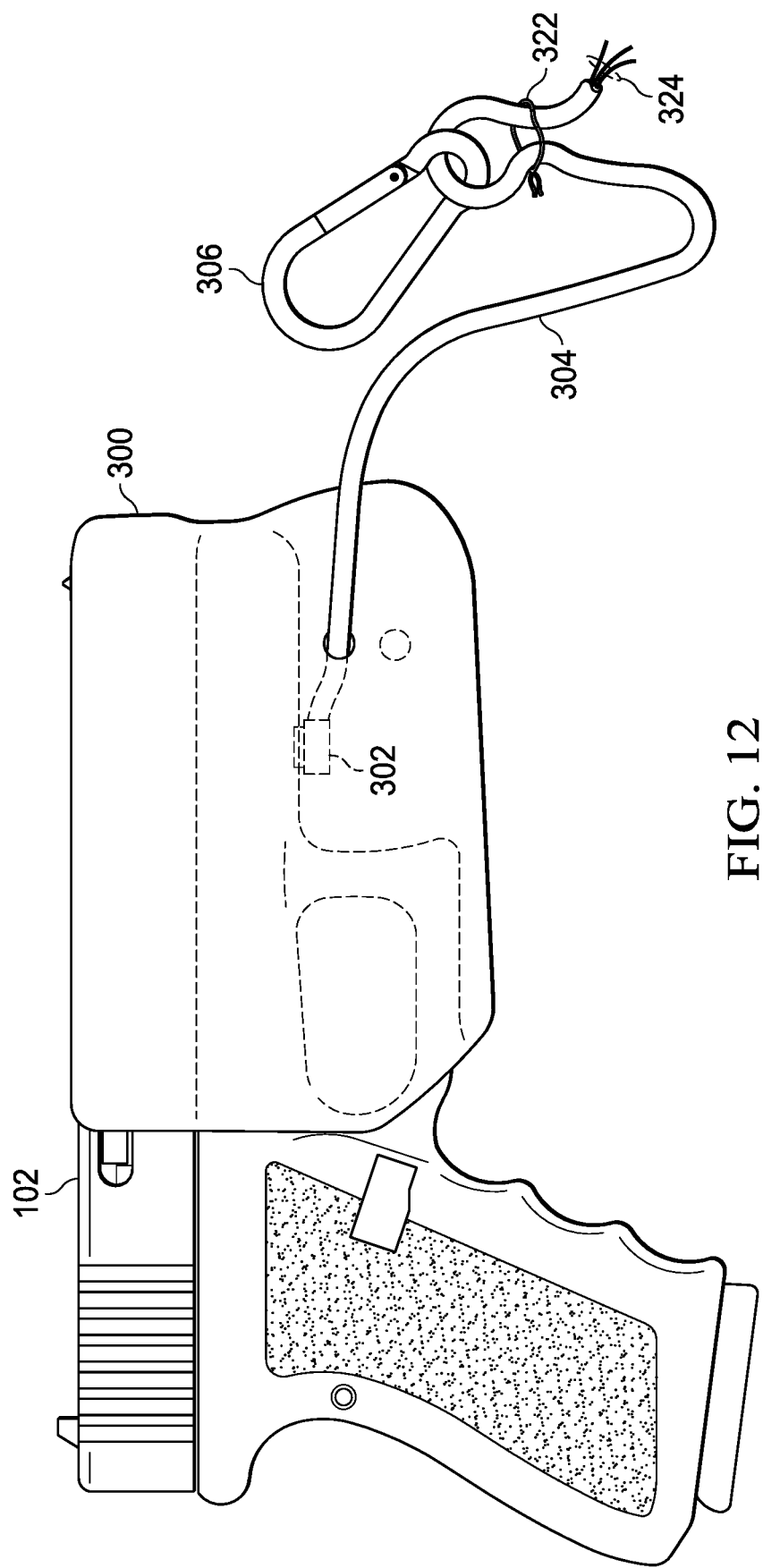
FIG. 12 exemplifies a Kydex® holster with a switch mounted therein.
Figure 13:
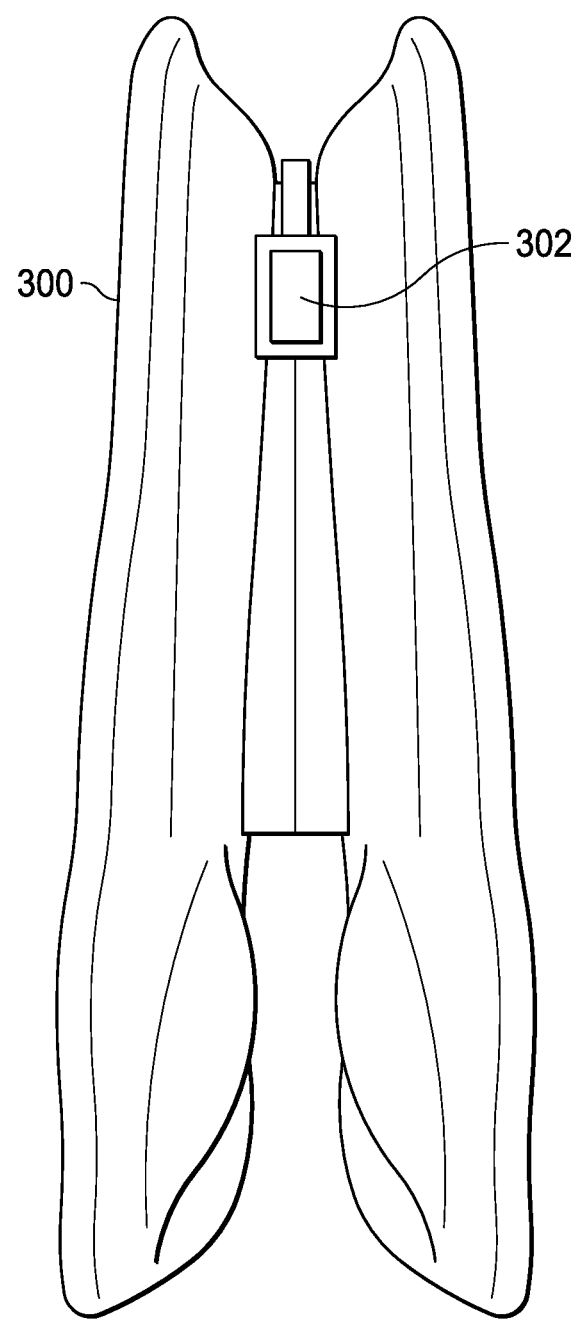
FIG. 13 shows a switch internal to the Kydex® holster of FIG. 12.

In a still further embodiment, FIGS. 12 and 13 utilize a Kydex® trigger guard 300 as described above with respect to FIGS. 8 and 9. A switch 302 however is mounted under the pistol barrel and is configured for sending a signal through a tether cable 304 if pistol 102 is removed from the trigger guard. Tether cable 304 comprising wires 324 is secured to a purse or pouch or the like via a hook such as a carabiner 306 secured on tether cable 304 via a tie 322.

Figure 14:
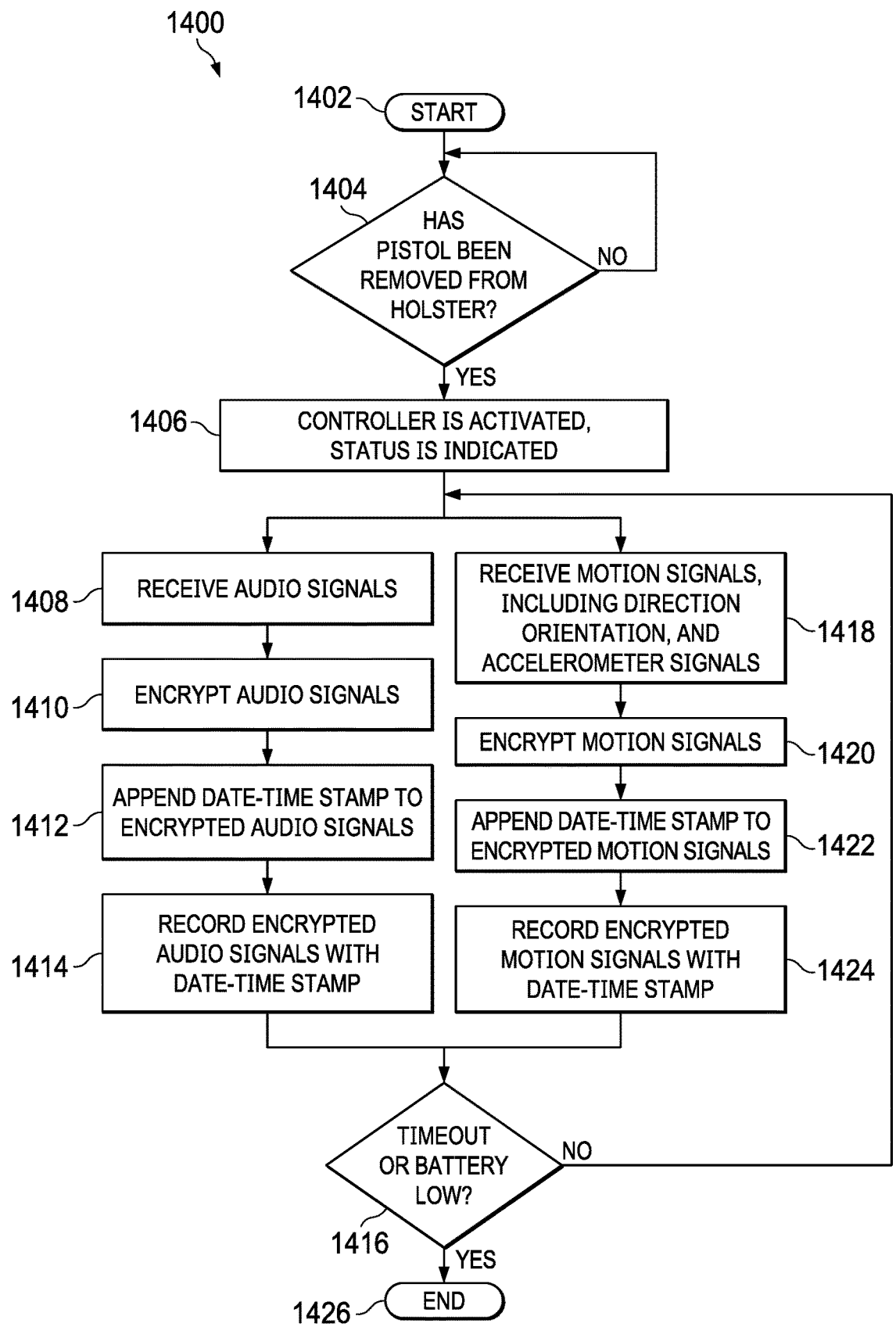
FIG. 14 is a flow chart exemplifying steps of operation of the invention.

FIG. 14 exemplifies steps 1400 in the operation of the invention. Beginning in step 1402, execution proceeds to step 1404 wherein a determination is made whether pistol 102 has been removed from holster 104. If it is not determined that pistol 102 has been removed from holster 104, then execution remains at step 1404; otherwise, execution proceeds to step 1406. While not shown, a person may alternatively override step 1404 by activating record switch 262 to manually initiate recording and proceed directly to step 1406. In step 1406, controller 250 is activated and green status LED 264 lights up. In steps 1408-1414, audio signals are received and encrypted, a date-time stamp is appended to the encrypted audio data, and the encrypted audio signal is recorded in memory 252. Steps 1410 and 1412 may be reversed. In steps 1418-1424, motion signals are received and encrypted, a date-time stamp is appended to the encrypted motion data, and the encrypted motion signal is recorded in memory 252. Steps 1420-1422 may be reversed. At step 1416, a determination is made whether to quit recording due to a timeout (e.g., after 30 minutes), or due to low battery power. If not, then execution returns to steps 1408 and 1418.

It is understood that the present invention may take many forms and embodiments. Accordingly, several variations may be made in the foregoing without departing from the spirit or the scope of the invention. For example, capacitive touch activation may be utilized to operate the device, e.g., to power on the device, or activate the record function.

In another example, Near Field Sensing (NFS), a system that communicates in one direction, may be employed by sensing the presence of a small fixed magnetic field that can be strategically positioned on the weapon to signify that the weapon is either in the holster or has been deployed by closing a switch.

In a still further example, Radio Frequency Identification (RFID) is a weapon deployment indicator much like NFS, but it relies on radio signals transmitted back from an RFID chip and a transmitter is positioned on the weapon to discern whether a weapon is either in the holster or has been deployed.

In a still further example, Bluetooth and/or Near Field Communication (NFC) may be used to transfer and store data on a phone, activate the phone's audio and/or visual recording system, establish a GPS location, and automatically dial 911 and send data, such as a user's location.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A device for recording pistol activity, the device comprising:
   a printed circuit board (PCB);
   a controller mounted on the PCB;
   a memory coupled to the controller for storing data received from the controller;
   an electrical power supply coupled to the controller and memory for supplying electrical power to the controller and memory;
   a microphone coupled to the power supply and controller for generating audio signals to the controller for recordation in the memory; and
   a remote enable connector coupled to the controller and configured for mounting in a holster with a mechanical switch to power the device when the pistol is deployed.

2. The device of claim 1, wherein the power supply is a battery.

3. The device of claim 1, further comprising an output connector coupled to the controller for outputting data stored in the memory to an external device.

4. The device of claim 1, wherein the mechanism is a spring-loaded lever positioned against the pistol for movement with removal of the pistol from the holster, and upon movement of the lever, to generate a pistol removal signal to the controller.

5. The device of claim 1, further comprising a clock coupled to the controller for providing date-time stamps for the controller to apply to the audio signals.

6. The device of claim 1, further comprising an accelerometer mounted to the PCB and coupled to the controller for generating to the controller motion signals indicative of motion along three axes, which motion signals are recordable by the controller in the memory.

7. The device of claim 1, further comprising a compass mounted to the PCB and coupled to the controller for generating to the controller direction signals indicative of direction of motion along three axes, which direction signals are recordable by the controller in the memory.

8. The device of claim 1, further comprising a gyroscope mounted to the PCB and coupled to the controller for generating to the controller gyroscopic signals indicative of orientation along three axes, which gyroscopic signals are recordable by the controller in the memory.

9. The device of claim 1, further comprising a record switch mounted on the device for activating the controller to receive and record to the memory the audio signals.

10. The device of claim 1, further comprising an indicator coupled to the controller to indicate that recording is active.

11. The device of claim 1, further comprising an indicator coupled to the controller to indicate battery status.

12. The device of claim 1, wherein the controller is configured for encrypting signals stored in memory.

13. The device of claim 1, wherein the controller is configured for recording audio signals for a predetermined period of time.

14. The device of claim 1, further comprising:
motion and compass direction indicators coupled to the controller for generating to the controller signals indicative of motion and compass direction, which motion and compass direction signals the controller stores in the memory; and
wherein the controller is configured for recording, for a predetermined period of time, audio signals and motion and compass direction signals.

15. The device of claim 1, further comprising an output connector mounted on the PCB and coupled to the controller for outputting data stored in the memory to a computer configured with acoustical characteristic software configured for analyzing gunshots recorded by the device against gunshots from the gun in question.

16. The device of claim 1, further comprising:
an accelerometer mounted to the PCB and coupled to the controller for generating to the controller motion signals indicative of motion, which motion signals are recordable by the controller in the memory; and
an output connector mounted to the PCB and coupled to the controller for outputting motion data stored in the memory to a computer configured with motion characteristic software configured for analyzing motion recorded by the device and for generating to a graphical display a graphical image representing motion of the user.

17. The device of claim 1 wherein the holster is made from Kydex®.

* * * * *